Jan. 28, 1964  D. O. EDMONSON  3,119,128
SECTIONAL BOAT
Filed Nov. 16, 1962  3 Sheets-Sheet 1
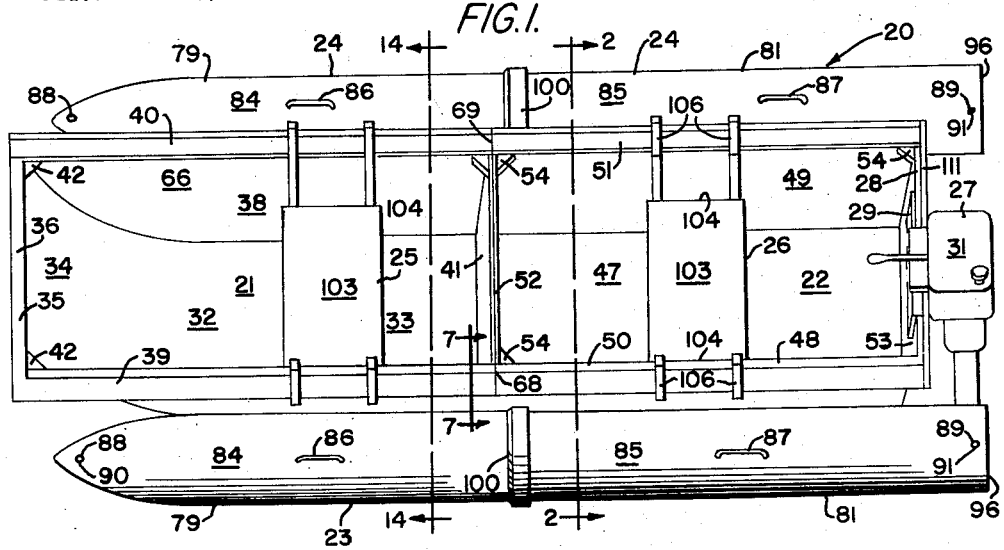
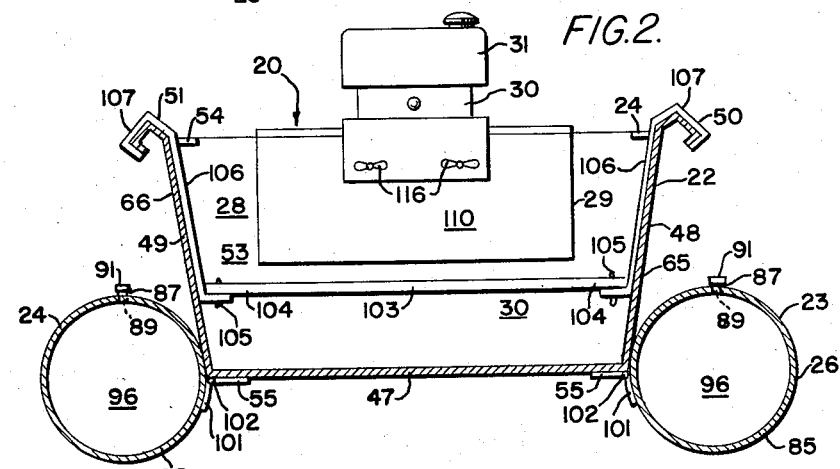
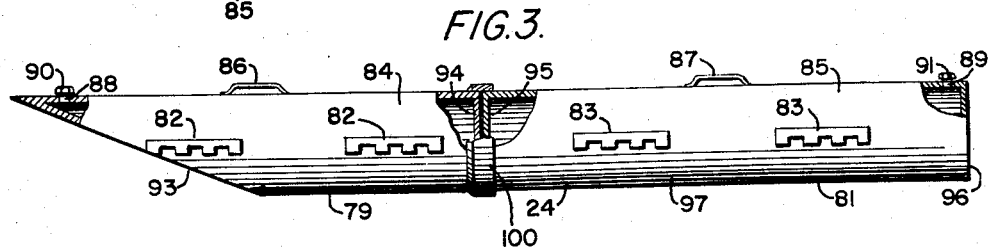
INVENTOR.
DANIEL O. EDMONSON
By
L.S. Van Landingham, Jr.

Jan. 28, 1964 D. O. EDMONSON 3,119,128
SECTIONAL BOAT
Filed Nov. 16, 1962 3 Sheets-Sheet 2
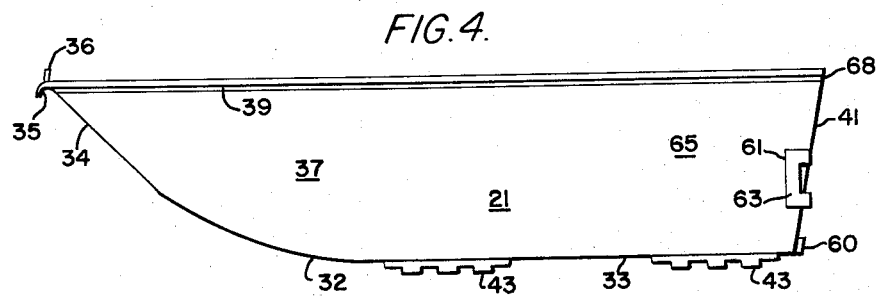
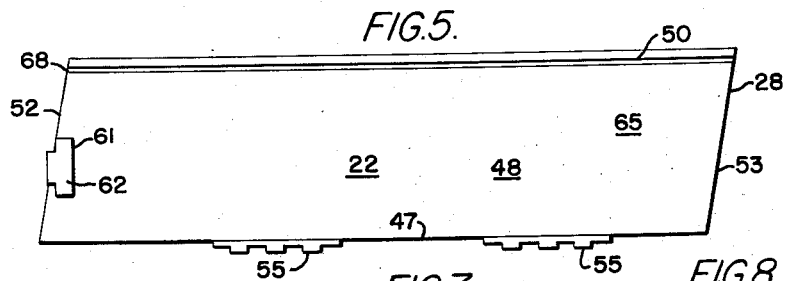
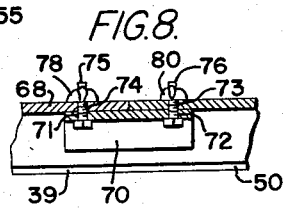
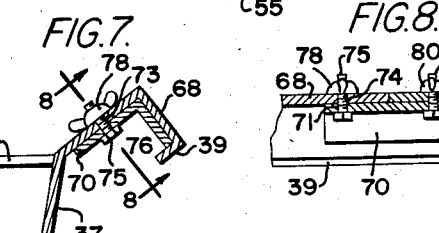
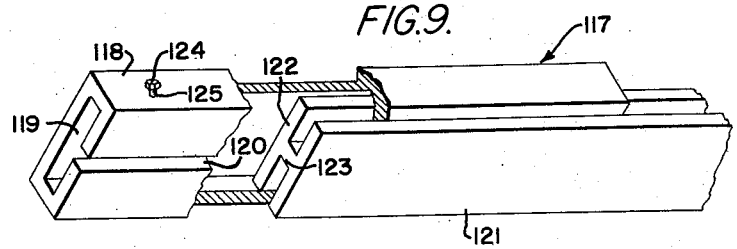
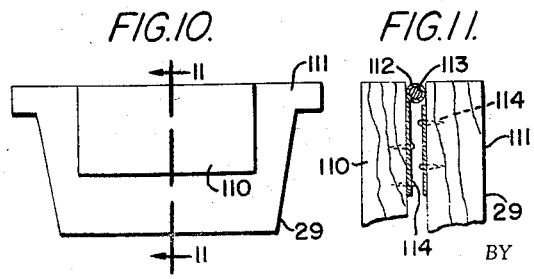
INVENTOR
DANIEL O. EDMONSON Jan. 28, 1964   D. O. EDMONSON   3,119,128
SECTIONAL BOAT
Filed Nov. 16, 1962   3 Sheets-Sheet 3

INVENTOR
DANIEL O. EDMONSON

By L. S. Van Landingham, Jr.

United States Patent Office 3,119,128
Patented Jan. 28, 1964

3,119,128
SECTIONAL BOAT
Daniel O. Edmonson, 711 School St., Clarksdale, Miss.
Filed Nov. 16, 1962, Ser. No. 238,232
20 Claims. (Cl. 9—2)

This invention relates to an improved sectional boat.

The boating and fishing public has long needed a sectional boat which may be easily disassembled into relatively small sections and then readily assembled once again at the point of use. Such a craft could be transported within an automobile, truck, bus and the like, and it would eliminate the need for a boat trailer or car top rack. The public has also desired a sectional boat which is capable of accommodating two or more people comfortably and safely, and which is so ruggedly and safely constructed that it is almost impossible to sink. An additional desirable feature of such a boat is that it be light in weight and useful for either fishing or as a high speed sportscraft. However, prior to the present invention a sectional boat having the above characteristics has not been available.

It is an object of the present invention to provide an improved sectional boat.

It is a further object to provide a sectional boat which may be readily assembled and disassembled, and which may be easily transported within an automobile.

It is still a further object to provide a sectional boat which is light in weight and yet strong and rugged in construction.

It is still a further object to provide a sectional boat with pontoons which has a plurality of separate and distinct watertight compartments which render the boat almost unsinkable.

Still other objects and advantages of the invention will be apparent to those skilled in the art upon reference to the following detailed description and the drawings, wherein:

FIGURE 1 illustrates a presently preferred embodiment of the sectional boat of the invention with seats and an outboard motor attached thereto;

FIGURE 2 is a sectional view taken along the lines 2—2 of FIGURE 1;

FIGURE 3 is a view in elevation, partly in section, of a pontoon constructed in accordance with the invention;

FIGURE 4 is a view in elevation of the bow section of the boat of FIGURE 1;

FIGURE 5 is a view in elevation of the stern section of the boat of FIGURE 1;

FIGURE 6 is a view in elevation of the hinge joining the bow and stern sections of FIGURES 4 and 5;

FIGURE 7 is a sectional view taken along the lines 7—7 of FIGURE 1, with portions broken away, illustrating one arrangement for attaching the bow and stern boat sections;

FIGURE 8 is a sectional view taken along the lines 8—8 of FIGURE 7;

FIGURE 9 illustrates an alternative means for fastening the pontoon sections to the boat sections;

FIGURE 10 is a view in elevation of the motor mount of the invention;

FIGURE 11 is a sectional view taken along the lines 11—11 of FIGURE 10;

Figure 12:
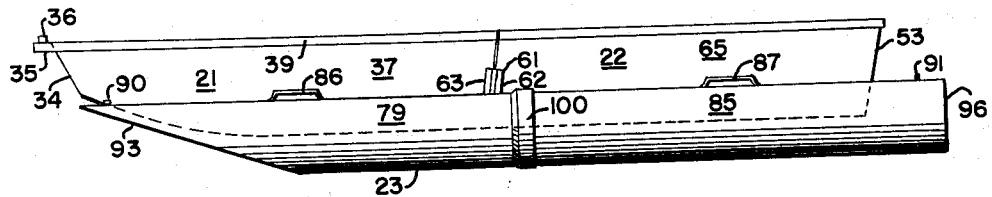
FIGURE 12 is a view in elevation of the assembled sectional boat of the invention.

Referring now to the drawings, the sectional watercraft or boat 20 includes a bow boat section 21 and a stern boat section 22. A port pontoon 23 extends along the port side of the boat sections, and a starboard pontoon 24 extends along the starboard side of the boat sections. A seat 25 and a seat 26 are provided in bow section 21 and stern section 22, respectively. Also, a motor 27 is attached to the stern 28, and a motor mount 29 is provided to aid in attaching the motor.

The bow section 21 has a bottom 32 which includes a substantially flat bottom portion 33, and the bottom 32 then curves upward toward the bow end 34 and terminates in a reinforcing member 35. The reinforcing member 35 may be an extension of the bottom which is curved downward to thereby provide for reinforcement across the bow and also aid in deflecting water and prevent its entrance into the boat. The reinforcing member 35 may be provided with handle 36 to aid in handling the boat in general. The sides 37 and 38 extend upward from the port and starboard sides, respectively, of the bottom 32 and are flared outward to thereby provide a wider transverse dimension at the top than at the bottom. The sides 37 and 38 terminate at their upper ends in longitudinal reinforcing members 39 and 40, respectively, which are bent outward and then downward. The flared sides 37 and 38 coact with the reinforcing members 39 and 40, respectively, to deflect wave action and thereby reduce the amount of water entering the boat from this source. The bow boat section 21 is also provided with a flat, transverse member 41 at its aft end, which together with the bottom 32 and sides 37 and 38 assure the watertight integrity of bow section 21. Additionally, gussets 42 are provided in each of the four corners and hinge halves 43 are attached to the bottom 32 for the purpose of mounting the port and starboard pontoons 23 and 24 thereon.

The stern boat section 22 includes a substantially flat bottom 47 and port and starboard sides 48 and 49, respectively, which extend upward therefrom. The sides 48 and 49 are flared outward as they extend upward, to thereby provide a greater transverse dimension at their top than at the bottom, and terminate at the top in longitudinal reinforcing members 50 and 51, respectively, which are similar in construction to longitudinal reinforcing members 39 and 40. Flat transverse members 52 and 53 extend upward from bottom 47 and are joined to sides 48 and 49 to thereby complete the watertight integrity of stern section 22. Additionally, gussets 54 of a construction similar to gussets 42 are provided in each of the four corners to reinforce the same. Also, hinge halves 55 are attached to the bottom 47 of stern section 22 near the points where the bottom 47 and sides 48 and 49 join for the purpose of mounting the pontoons 23 and 24 thereon.

It may be noted that the transverse member 41 of bow section 21 is flared toward the stern of the boat 20 as it extends upward from the bottom 32 and the transverse members 52 and 53 of stern section 22 are likewise flared toward the stern of the boat 20 as they extend upward from the bottom 47. Also, the bow section 21 is provided with a cradle member 60 which extends across bottom 32 toward the stern of the boat and a short distance up the sides 37 and 38 to thereby provide means for supporting and retaining the bow and stern boat sections in their proper positions at this point. Additionally, a hinge 61 is positioned approximately midway between the bottom and top of each of the sides 65 and 66 of boat 20, with a hinge half 62 being provided on each of the sides 48 and 49 and a matching hinge half 63 being provided on each of the sides 37 and 38. Upon placing the stern section 22 within cradle 60 and matching hinge halves 62 and 63, the hinge pin 64 may be inserted thereby locking the bow and stern sections 21 and 22 in place and reinforcing the boat 20 midway between the top and bottom of sides 65 and 66.

The bow section 21 and stern section 22 are also joined at points 68 and 69 at the junction of their port and starboard longitudinal reinforcing members 39, 40, 50 and 51 to thereby further reinforce the top of sides 65 and 66 and assure a strong structure. As best seen in FIGURES 7 and 8, the reinforcing members 39 and 50 at point 68 are joined and reinforced by means of a short angle member 70 provided with openings 71 and 72, which match similar openings 73 and 74 in longitudinal reinforcing members 39 and 50, respectively, through which bolts 75 and 76, respectively, pass. Wing nuts 78 and 80 are tightened in place on bolts 75 and 76, respectively, to join the upper sections of the bow and stern sections 21 and 22 together in a positive manner. The reinforcing members 40 and 51 at point 69 are joined in the same manner as described above for reinforcing members 39 and 50 at point 68.

Figure 16:
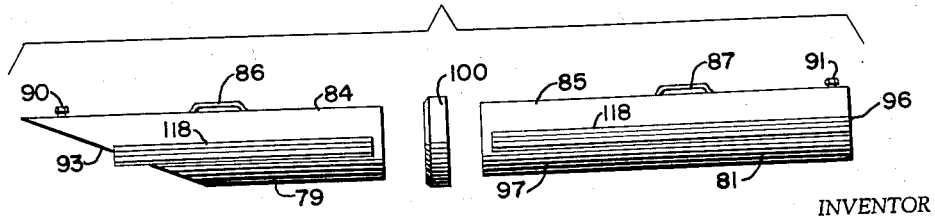
FIGURE 16 is a view of the pontoon sections.

As best seen in FIGURES 2, 3 and 16, the port and starboard pontoons 23 and 24 are of similar construction with the hinge halves 82 and 83 being mounted on the inboard side of watertight bow and stern pontoon sections 79 and 81, respectively, to match with the corresponding hinge halves 43 and 55, respectively, on the bow and stern sections 21 and 22. Each of the pontoons 23 and 24 has two hollow cylindrical members 84 and 85 which are provided with handles 86 and 87 and test openings 88 and 89, respectively. The test openings 88 and 89 are provided with bolts 90 and 91, respectively, to maintain the watertight integrity of pontoon sections 79 and 81 when they are not being tested. The cylindrical members 84 are sloped on their fore ends to reduce water resistance when the boat is in motion, and are closed on the fore ends by means of flat members or plates 93 and on the aft ends by means of transverse members 94. Transverse members 95 and 96 close off the ends of cylindrical member 85. Cuffs 100 are attached to the aft ends of bow pontoon sections 79 and extend beyond members 94 a short distance, thereby providing convenient annular openings for inserting the fore ends of stern pontoon sections 85 thereinto. The cuffs 100 form a close fit with fore ends of the stern pontoon sections 81 and together with hinges 101 assure that the pontoon sections 79 and 81 are properly aligned and retained in a positive manner.

Figure 14:
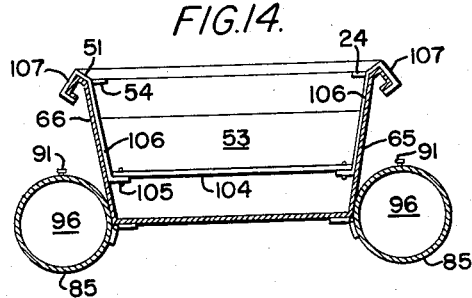
FIGURE 14 is a sectional view taken along the lines 14—14 of FIGURE 1.

As best seen in FIGURES 1 and 2, the seats 25 and 26 are of similar construction and include a seat portion 103 which is attached at either end 104 by means of bolts 105 to straps 106. The straps 106 may be formed of metal and shaped to conform with the internal surfaces of the sides 65 and 66 and may extend upward over the longitudinal reinforcing members 39 and 40 or 50 and 51 in close conformity thereto, as best seen in FIGURES 2 and 14. This assures a sliding fit which is strong and yet longitudinal adjustments may be made with little force being required by sliding the straps 106 along the longitudinal reinforcing members.

The motor mount 29 includes a forward portion 110 and a larger aft portion 111 hinged together at their upper ends by means of hinge 112 which extends across the width of forward portion 110. The hinge 112 is provided with pin 113 and the hinge 112 is secured to members 110 and 111 by means of screws 114. Preferably, the members 110 and 111 are constructed of wood, or other tough non-metallic material which will allow motor 27 to be attached by means including clamps 116 without damage thereto. Preferably, the member 111 extends over a major proportion of the outer surface area of the stern 28 so as to assure a substantially uniform force against the transverse member 53 when driven by motor 27. For best results, the member 111 is shaped to substantially cover the transverse member 53 and the rear ends of longitudinal reinforcing members 50 and 51.

Figure 15:
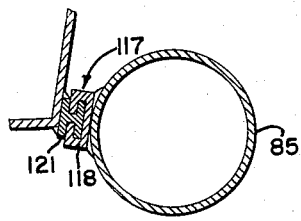
FIGURE 15 is a view illustrating the use of the alternate means of FIGURE 9 for fastening the pontoons to the boat sections.

While hinges 61 and 101 are shown for connecting the bow and stern sections 22 and 23 together and mounting the port and starboard pontoons 23 and 24 thereon, other alternate types and forms of connecting means may be used. One especially desirable alternate connecting means is illustrated in FIGURES 9 and 15. Upon reference to FIGURES 9 and 15, the extrusions 117 include a C-shaped section 118 having an internal opening 119 and a slot 120, and an H-shaped member 121 having a side portion 122 which is inserted in opening 119 and a cross member 123 slidably mounted in slot 120. The member 121 may be moved to a desired position and a setscrew 124 in opening 125 may be provided for locking member 121 in place to thereby prevent further relative movement.

As best seen in FIGURE 16, C-shaped extrusion members 118 are attached to the inboard sides of port and starboard pontoons 23 and 24, and the H-shaped extrusion members 121 are attached to the boat sections 21 and 22 at points near the bottoms 32 and 47 and the hinges 101 shown in the remaining modifications are eliminated.

The bow and stern boat sections 21 and 22 are separate and distinct watertight compartments and it is not possible for water to pass from one boat section to the other should one spring a leak. The sides 65 and 66 flare outward at the top to thereby repel wave action caused by wind or other boats. Additionally, the longitudinal reinforcing members 39, 40, 50 and 51 are bent outward and then downward to thereby coact with the flared sides 65 and 66 to deflect waves and prevent water from entering the boat. Additionally, the bow reinforcement 35 is bent outward and downward to thereby deflect waves in a manner similar to the sides.

The bow and stern pontoon sections 79 and 81 are separate and distinct watertight compartments with water not being able to pass from one pontoon section to another. Thus, if one pontoon section is accidentally damaged, the remaining pontoons retain their buoyancy and aid in keeping the boat afloat.

Figure 13:
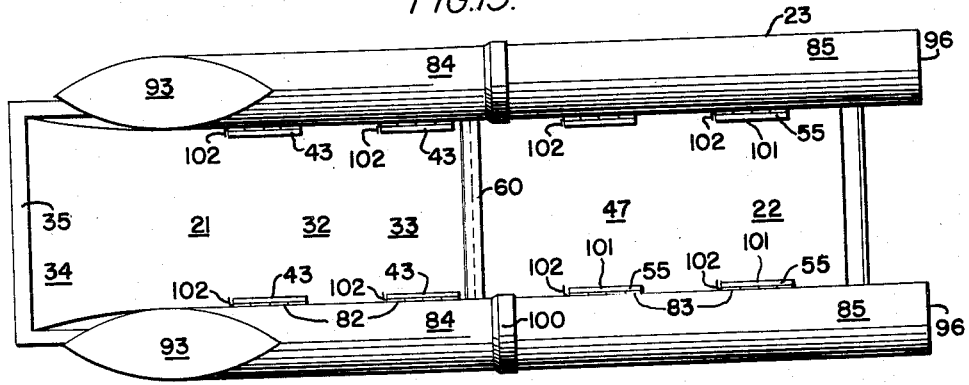
FIGURE 13 is a bottom view of the assembled sectional boat of the invention.

As best seen in FIGURES 2 and 13, half hinges 43 and 55 are mounted on the bottoms 32 and 47 of the bow and stern boat sections 21 and 22, respectively, and half hinges 82 and 83 are mounted on the pontoon sections 79 and 81, respectively, at points to assure that about one-half of the volume of the pontoons is below the bottoms 32 and 47. This arrangement assures that the center of gravity of the pontoons is lower than the center of gravity of the boat, and also the pontoons act as a double keel for the boat. As a result, it is almost impossible to capsize the boat.

The stern pontoon sections 81 may extend beyond the stern 28 a sufficient distance to prevent an undesirable degree of tipping of the bow upward caused by a weight concentration in stern section 22 due to the motor and a person in seat 26 operating the motor. This is especially important at high speeds, at which time there is a pronounced tendency for the bow of boats constructed in accordance with the prior art to raise upward to an undesirable extent. This may be prevented in the construction shown and described herein and the boat planes at high speed.

It may be noted that the pontoon sections 79 and 81 also extend beyond the aft portions of each of the boat sections 21 and 22, respectively, and this likewise is of importance. For instance, it is possible in accordance with the present invention to remove hinge pins 64 and angle members 70 and separate the bow and stern boat sections 21 and 22 with the pontoon sections 79 and 81, respectively, remaining attached thereto. The separated sections then may be used by different persons in different locations and when so used it is important to have the pontoon sections extend beyond the aft end of the boat section and provide stability in a longitudinal direction, as well as in a transverse direction. Thus, each of the boat sections described herein is designed so as to have pontoon sections attached thereto thereby allowing each boat section to be used separately when desired, as well as collectively to form a larger boat.

It is also possible to join more than two boat sections together. For example, two or more boat sections similar to stern section 22 may be joined together in the manner described and then connected with a bow boat section 21 to provide three or more attached boat sections. Thus, the design of the boat and pontoon sections of the present invention allows unique flexibility which has not been attainable heretofore.

The cuffs 100 are preferably flared at their aft ends to thereby allow the fore ends of the stern pontoon sections to slide readily thereinto. This allows assembly of the pontoons 23 and 24 to be effected in the shortest possible period of time and yet it does not detract appreciably from the strength since the cuffs 100 fit snugly against the pontoon sections 81 when fully inserted and the hinges 101 prevent substantial horizontal as well as longitudinal movement.

The sectional construction of the watercraft described herein eliminates the necessity for a trailer or car top carrier to transport it from one location to another. For example, the preferred embodiment specifically described herein includes six sections, namely the two bow and stern boat sections 21 and 22 and the four pontoon sections 79 and 81. The two bow pontoon sections 79 preferably are 53" in length including a 1" cuff 100, and the two rear pontoon sections 81 preferably are 48" in length. The pontoon sections 79 and 81 may be 8" in diameter. The stern boat section 22 is preferably 42" in length and the bow boat section 21 is preferably 51½" in length, including a 1½" cradle 60. The boat sections 21 and 22 may be 20" in width at the bottom and 24" at the top. Thus, the sectional boat when disassembled may be easily loaded in the rear of a standard sized automobile by placing the stern boat section 22 within the bow boat section 21 on the rear seat of the car, and then placing the four pontoon sections 79 and 81 on the rear floor. This allows the trunk of the car to be used for transportation of the motor and other equipment needed.

The sectional boat described herein may be readily assembled by one person in five minutes or less or by two persons in approximately two to three minutes. This may be accomplished by selecting a level spot and placing the bow section 21 on the ground bottomside up so that the half hinges 43 on the bottom 32 are readily accessible. Then, the stern boat section 22 may be placed on the ground about four inches to the rear of the bow boat section 21, and the bottom side turned up. The boat sections 21 and 22 are aligned and the port and starboard bow pontoon sections 79 may be arranged in their respective places alongside of the bow boat section 21, and the port and starboard stern pontoon sections 81 may be placed in their respective places alongside the stern boat section 22. The hinge halves 82 and 83 on the pontoon sections 79 and 81 and the hinge halves 43 and 55 on the boat sections 21 and 22, respectively, are meshed and the hinge pins 102 inserted from the bow end of the boat. It is desirable that the trailing end of the hinge pins 102 always be toward the bow end of the boat as otherwise they may be removed and lost when the boat is in motion. After attaching the pontoon sections 79 and 81 to their respective boat sections 21 and 22, it is possible to attach the stern boat section 22 to the bow boat section 21 by slipping the stern pontoon sections 81 into the cuffs 100 and then mesh the hinges 61 and 101 and insert the hinge pins 64 and 102, respectively. Thereafter, the assembled boat is turned right side up, the angles 70 inserted under the top side of the longitudinal reinforcing members 39—40 and 50—51, the openings 71 and 72 in the angles and 73 and 74 in the reinforcing members matched, the bolts 75 and 76 inserted, and the wing nuts 78 and 80 tightened into place to complete the assembly.

The craft may be disassembled by following the above steps in reverse. However, it is usually more convenient to pull the craft from the water, turn it bottomside up, remove the hinge pins 102 from the hinges 101 joining the pontoon sections 79 and 81 with the boat sections 21 and 22, then remove the hinge pins 64 from the hinges 61 joining the sides 65 and 66, and thereafter turn the boat right side up and remove the angles 70 from the reinforcing members 39—40 and 50—51.

The sectional boat described herein is preferably constructed from relatively light weight aluminum sheet and tubes, and the various members may be joined by heli arc welding to assure watertight seams. It is also possible to use fiber glass reinforced plastic laminates or other suitable materials of construction.

The sectional boat may be propelled with a paddle or oar, or by a motor as shown. When a motor is used, it is often desirable to employ a motor mount 29 such as described herein so that the motor may be conveniently attached to the stern by means of the conventional clamps without damaging the aluminum or fiber glass construction. Additionally, the outside surface of the stern may be largely covered with the portion 111 of the motor mount, which prevents damage and assures a more uniform distribution of force from the motor and prevents undue depression of the stern at high speeds.

Any suitable means may be used for joining the pontoons to the boat sections, or for joining the two boat sections together. While hinges and suitably designed extrusion members have been described herein for this purpose, still other means may be selected by those skilled in the art.

The foregoing detailed description and the accompanying drawings are for purposes of illustration only and are not intended as being limiting to the spirit or scope of the appended claims.

What is claimed is:
1. A sectional boat comprising
   a plurality of boat sections including bow and stern boat sections,
   each of the boat sections being a separate watertight compartment when floating in water in the upright position,
   means for connecting the plurality of boat sections together,
   the aft end of each boat section with the exception of the stern boat section being connected with the fore end of the immediately succeeding boat section and being detachable therefrom,
   the fore end of each boat section with the exception of the bow boat section being connected with the aft end of the immediately preceding boat section and being detachable therefrom,
   a sectional port pontoon along the port side of the boat sections,
   a sectional starboard pontoon along the starboard side of the boat sections,
   each of the port and starboard pontoons having a plurality of pontoon sections including bow and stern pontoon sections,
   each of the pontoon sections being a separate watertight compartment,
   means for connecting the plurality of port pontoon sections together,
   the aft end of each port pontoon section with the exception of the port stern pontoon section being connected with the fore end of the immediately succeeding port pontoon section and being detachable therefrom,
   the fore end of each port pontoon section with the exception of the port bow pontoon section being connected with the aft end of the immediately preceding port pontoon section and being datachable therefrom,
   means for connecting the plurality of starboard pontoon sections together, the aft end of each starboard pontoon section with the exception of the starboard stern pontoon section being connected with the fore end of the immediately succeeding starboard pontoon section and being detachable therefrom.

the fore end of each starboard pontoon section with the exception of the starboard bow pontoon section being connected with the aft end of the immediately preceding starboard pontoon section and being detachable therefrom, means for mounting the port pontoon on the boat sections and means for mounting the starboard pontoon on the boat sections, the port and starboard pontoons being mounted so as to be detachable from the boat sections.

2. The sectional boat of claim 1 wherein the port and starboard stern pontoon sections extend outward past the aft end of the stern boat section.

3. The sectional boat of claim 1 wherein the center of gravity of the port and starboard pontoons is lower than the center of gravity of the boat sections.

4. The sectional boat of claim 3 wherein the bottom of each boat section with the exception of the bow is substantially flat.

5. The sectional boat of claim 1 wherein the longitudinal sides of the boat sections are flared outward as they extend from the bottom to the top and the top portion of each of the sides is bent first outward and then downward to form a longitudinal reinforcing portion, the flared sides and longitudinal reinforcing portions coacting to deflect waves and thereby reduce the amount of water entering the boat by wave action.

6. The sectional boat of claim 5 wherein seat means is provided in at least one of the boat sections, the seat means including a seat portion suspended in the boat section by metal strap means shaped to conform with the interior of the longitudinal sides of the boat section, the strap means being attached to the seat portion and extending upward therefrom over the longitudinal reinforcing portions and being slidably mounted thereon whereby the seat means is movable longitudinally.

7. The sectional boat of claim 6 wherein the port and starboard stern pontoon sections extend outward past the aft end of the stern boat section, the center of gravity of the port and starboard pontoons is lower than the center of gravity of the boat sections, and the bottom of each boat section with the exception of the bow is substantially flat.

8. The sectional boat of claim 1 wherein motor mounting means is provided on the stern of the boat, the mounting means including two members shaped to conform with the stern hinged together and positioned across the stern with one of the members being inside the stern boat section and the other being outside, the member outside the stern boat section covering a major portion of the surface area of the stern.

9. A sectional boat comprising
bow and stern boat sections,
the bow and stern boat sections being separate watertight compartments when floating in water in the upright position,
means for connecting the bow and stern boat sections,
the aft end of the bow boat section being connected with the fore end of the stern boat section and being detachable therefrom,
a sectional port pontoon along the port side of the boat sections,
a sectional starboard pontoon along the starboard side of the boat sections,
each of the sectional boat and starboard pontoons having bow and stern pontoon sections,
each of the pontoon sections being a separate watertight compartment,
means for connecting the bow and stern port pontoon sections together, the aft end of the port bow pontoon section being connected with the fore end of the port stern pontoon section and being detachable therefrom,
means for connecting the bow and stern starboard pontoon sections together,
the aft end of the starboard bow pontoon section being connected with the fore end of the starboard stern pontoon section and being detachable therefrom,
means for mounting the port pontoon on the bow and stern boat sections and means for mounting the starboard pontoon on the bow and stern boat sections,
the port and starboard bow pontoon sections being removably mounted on the bow boat section and the port and starboard stern pontoon sections being removably mounted on the stern boat section.

10. The sectional boat of claim 9 wherein the port and starboard stern pontoon sections extend outward past the aft end of the stern boat section.

11. The sectional boat of claim 9 wherein the center of gravity of the port and starboard pontoons is lower than the center of gravity of the boat sections.

12. The sectional boat of claim 11 wherein the bottom of each boat section with the exception of the bow is substantially flat.

13. The sectional boat of claim 9 wherein the longitudinal sides of the boat sections are flared outward as they extend from the bottom to the top and the top portion of each of the sides is bent first outward and then downward to form a longitudinal reinforcing portion,
the flared sides and longitudinal reinforcing portions coacting to deflect waves and thereby reduce the amount of water entering the boat by wave action.

14. The sectional boat of claim 13 wherein seat means is provided in at least one of the boat sections,
the seat means including a seat portion suspended in the boat section by metal strap means shaped to conform with the interior of the longitudinal sides of the boat section,
the strap means being attached to the seat portion and extending upward therefrom over the longitudinal reinforcing portions and being slidably mounted thereon whereby the seat means is movable longitudinally.

15. The sectional boat of claim 14 wherein the port and starboard stern pontoon sections extend outward past the aft end of the stern boat section,
the center of gravity of the port and starboard pontoons is lower than the center of gravity of the boat sections,
and the bottom of each boat section with the exception of the bow is substantially flat.

16. The sectional boat of claim 15 wehrein motor mounting means is provided on the stern of the boat,
the mounting means including two members shaped to conform with the stern hinged together and positioned across the stern with one of the members being inside the stern boat section and the other being outside,
the member outside the stern boat section covering a major portion of the surface area of the stern.

17. The sectional boat of claim 9 wherein the bow and stern boat sections are detachable from each other, and when the bow and stern boat sections are detached from each other, the bow and stern port pontoon sections are detached from each other and the bow and stern starboard pontoon sections are detached from each other, then each of the resulting detached bow and stern boat sections is provided with its respective port and starboard pontoon sections which are attached thereto whereby the bow and stern boat sections each may be used separately as a boat.

18. The sectional boat of claim 9 wherein the bow boat section is provided with a cradle member extending transversely across the bottom and aftward past the aft end of the bow boat section, the bottom of the fore end of the stern boat section rests on top of the cradle member, means is provided for detachably connecting together the bow and stern boat sections at port and starboard points near the tops thereof, and means is provided for detachably connecting together the bow and stern boat sections at port and starboard points intermediate the tops and bottoms thereof whereby the bow and stern boat sections are positioned in place and securely connected together.

19. The sectional boat of claim 16 wherein the bow and stern boat sections are detachable from each other, and when the bow and stern boat sections are detached from each other, the bow and stern port pontoon sections are detached from each other and the bow and stern starboard pontoon sections are detached from each other, then each of the resulting detached bow and stern boat sections is provided with its respective port and starboard pontoon sections which are attached thereto whereby the bow and stern boat sections each may be used separately as a boat.

20. The sectional boat of claim 19 wherein the bow and stern boat sections rise above the pontoons a distance substantially greater than the diameter of the pontoons, the port and starboard pontoons are mounted on lower portions of the bow and stern boat sections near the bottoms thereof, the bow boat section is provided with a cradle member extending transversely across the bottom and aftward past the aft end of the bow boat section, the bottom of the fore end of the stern boat section rests on top of the cradle member, means is provided for detachably connecting together the bow and stern boat sections at port and starboard points near the tops thereof, and means is provided for detachably connecting together the bow and stern boat sections at port and starboard points intermediate the tops and bottoms thereof whereby the bow and stern boat sections are positioned in place and securely connected together.

References Cited in the file of this patent
UNITED STATES PATENTS

| | | |
|---|---|---|
| 234,164 | Armstrong | Nov. 9, 1880 |
| 1,151,115 | Maxwell | Aug. 24, 1915 |
| 2,815,517 | Andresen | Dec. 10, 1957 |
| 2,916,748 | Stahmer | Dec. 15, 1959 |
| 2,977,607 | Roblee | Apr. 4, 1961 |